United States Patent Office 3,070,562
Patented Dec. 25, 1962

3,070,562
FIBER-FORMING POLYAMIDE DISSOLVED IN A SOLVENT MIXTURE CONTAINING FORMIC ACID AND AT LEAST ONE OTHER COMPOUND
Charles Richard Koller, Wilmington, Del., assignor to E. I. du Pont de Nemours and Company, Wilmington, Del., a corporation of Delaware
No Drawing. Filed June 30, 1959, Ser. No. 823,826
9 Claims. (Cl. 260—31.2)

This invention relates to compositions of matter and more specifically to shaped structures of novel synthetic linear polyamides.

Synthetic linear polyamides of high molecular weight are well known and have been found to posses physical and chemical properties which are highly useful in the commerical arts. For example, polyhexamethylene adipamide and polyhexamethylene sebacamide are currently produced in large scale and have found wide application in such uses as textile fibers, bristles, industrial fibers and fabrics and molding powders. Elasticity, abrasion resistance, toughness, and fairly high insensitivity to water are among the properties which have made these and other synthetic polymers usable in commerce.

One limitation of most of the better known synthetic polymeric materials is their relatively low melting point. Textile fabrics made from synthetic fibers must be handled carefully in washing or cleaning and must be ironed at low temperatures to avoid partial melting or fusing of the fibers. In industrial uses, too, the low melting point of such materials places limitations on their use. Even more important, however, is the fact that such materials lose a great proportion of their strength at temperatures substantially below their melting point. One measure of this characteristic is the so-called second-order transition temperature, frequently abbreviated as Tg. This temperature is an internal softening point and is more completely described by R. F. Boyer and R. S. Spencer in "Advances in Colloid Science," vol. II, Interscience Publishers Incorporated, New York (1946). Below the second-order transition temperature, most of the physical properties such as modulus and elongation are substantially independent of the temperature. Above Tg, however, modulus and tenacity decrease, while elongation and shrinkage increase. It can readily be seen that the temperature to which an amorphous polymeric material may be exposed during actual use conditions must be below the second-order transition temperature, if the maximum desirable physical properties of that polymer are to be realized. Many of the synthetic polymers widely used in commerce today have second-order transition temperatures so low as to limit drastically the uses to which they can be put. For example, polyhexamethylene adipamide has a Tg of 50° C., and polyethylene terephthalate has a Tg of 80° C.

Some polymers having a low Tg may be rendered more temperature-resistant by increasing the crystallinity of the structure; and, heretofore, whenever a high-melting synthetic polymer has been desired, highly crystalline substances have been the object of first consideration. Deficiencies, such as poor dyeability, brittleness and the like which accompany crystallinity, have been accepted as necessary evils accompanying any high-melting polymers.

Polymers with extremely high melting point, even among crystalline substances, have been unavailable in the form of shaped structures such as textile and industrial filaments because of a combination of the very properties which made them desirable. Their extremely high melting point makes it impossible to melt-spin them into usable shapes. Furthermore, the molecular structure which contributes to their high melting point is such that they prove to be insoluble in the more common solvents and even in some cases insoluble in all known solvents. For commercial utility, it is not sufficient that a solvent dissolve a polymer. Many polymeric materials are soluble in meta-cresol and sulfuric acid, and solutions of polymer in these liquids are suitable for testing purposes such as viscosity determinations. However, meta-cresol has a boiling point of 202° C. and is highly unsatisfactory for use as a dry-spinning solvent. Sulfuric acid, in addition to being even higher boiling than meta-cresol, is highly corrosive and, moreover, its use promotes polymer degradation during standing. To be commercially useful for spinning, a solvent must exhibit chemical inertness and high volatility and should not be corrosive toward the processing equipment with which polymer solutions will come in contact during spinning operations. Without such a solvent, a polymer which cannot be melt-spun is usually not considered attractive for commerical use.

In addition to good high temperature behavior, there are several physical properties which are important in a synthetic polymer for use as a fiber. Among these are high work and tensile recovery, suitable initial modulus, and resistance to abrasion and to repeated flexing.

High work recovery contributes to a good handle or "feel" in textile fabrics, and to retention of good appearance in garments. For industrial uses, high work recovery means that the material will not absorb energy excessively in use, and, therefore, will not heat up unduly. High tensile recovery is of obvious value because a material for either textile or industrial application must recover well from stretching. Poor tensile recovery means loss of shape, easy distortion, short life, and limited usefulness.

Fiber intitial modulus (Mi) is the designation for the initial slope of the stress-strain curve of a fiber. For different end-uses, different moduli are desirable, and, for that reason, there is no single best value for Mi. However, it is important that the modulus should not change too greatly under use conditions.

Good abrasion and flex resistance of yarns and fabrics can make important contributions to their utility. These qualtities are normally measured by wear-testing in actual use, or by such devices as the Stoll Flex Tester, which is described fully in "An Improved Multipurpose Abrasion Tester, and Its Application for the Evaluation of the Wear Resistance of Textiles," Quartermaster Corps Report, by R. G. Stoll, March 1949. Among commercially produced synthetic textile fibers, viscose rayon has a fairly high abrasion resistance; a typical test shows that a sample of continuous filament viscose rayon yarn rendered 250 cycles on a standard Stoll Abrasion Tester before it failed. This value may be compared with 10 cycles for continuour filament acetate yarn and 80 cycles for an acrylic filament.

Efforts to improve the qualities of existing polymers, or to prepare new polymers, to satisfy the needs discussed above have been substantially less than successful. In certain instances, improvements have been made in one or another properties, but there has been no success in producing a synthetic polymer satisfying the above requirements without loss of other desirable characteristics.

One object of this invention is to provide a shaped structure of a new amorphous linear polyamide characterized by extremely high melting point, usually high recovery from elongation, a high degree of insensitivity to water, high modulus, high retention of modulus and general inertness to elevated temperatures, and a wide range of desirable physical properties. Another object is to provide a solution of a high-melting polyamide which is useful for dry-spinning.

Other objects of this invention and their means for attainment will be apparent from the following description.

In general, the objects of the present invention are accomplished by providing a solution of a polyamide reaction product of terephthalic acid or amide-forming derivative of that acid with any of certain alicyclic diamines in a solvent of which about ⅛ to ⅞ is formic acid and the rest is essentially nononitrated or mono- or poly-halogenated compound in which at least one halogen-substituted carbon carries a hydrogen also. These diamines can be formularized as

where R and R' represent single or fused-ring alicyclic groups and $x$ and $y$ individually can be either 0 or 1; accordingly, the resulting polyamide is characterized by the following recurring structural unit:

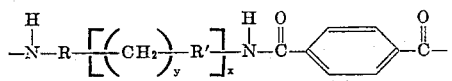

The polyamide is formed from the difunctional reactants, i.e., diamine and terephthalic acid or amide-forming derivative thereof, in known manner; although reaction at room temperature and pressure is sometimes feasible, the operation normally involves contact under inert atmosphere, usually first at elevated temperature and pressure and subsequently, under subatmospheric pressure. Examples of such preparation are given by Pease in Patents 2,516,585 and 2,696,482.

The starting diamines employed by Pease, as well as many others conforming to the above formula, normally exist as a mixture of isomers, one or all of which may be solid at the same temperature; however, excessive concentration of the higher-melting isomers can render the mixture itself solid, and the present invention is directed only to solutions of polyamides derived from those diamines normally liquid at room temperature (about 25° C.).

As suggested above, either terephthalic acid itself or one of its many amide-forming derivatives may be selected for reaction with the selected diamine; among the more convenient amide-forming derivatives are the anhydride, amides, halides, and carbamates, to mention a few.

The polyamide resulting from reaction of the two components can be dissolved readily in the solvents of this invention, usually at room temperature, although higher temperature may be employed for convenience. Concentrations suitable for dry-spinning of filaments are obtainable without difficulty, usually containing an amount of polymer within the range of from about 1/10, which represents a practicable solubility minimum for the present purposes, to about ¼ by weight based upon the solution.

For best filament formation, evaporation of the solvent should not require temperature so high as to soften the polymer itself. The polyamides considered here do not melt until reaching temperatures of 200° C. or above, so the normal boiling temperature of the solvent should be below 200° C. As the softening temperature of such polymer often is about 50 degrees below the melting temperature, occasionally even 60 or 70 degrees below, the boiling temperature of a solvent intended for dry-spinning preferably will not exceed that level.

In accordance with a preferred embodiment of this invention there is provided in filament form a synthetic linear polyamide which has too high a melting point for practical shaping of the material from a molten mass. The synthetic linear polyamides of this invention are prepared by reaction in solution of terephthalic acid or an amide or amide-forming derivative of that acid with bis-(4-aminocyclohexyl)methane or a mixture of isomers of this compound, which mixtures are liquid at room temperature. A synthetic linear polyamide of this embodiment is characterized by being predominantly amorphous and having a second-order transition temperature of at least about 200° C.

In carrying out the process of this embodiment of the invention a polyamide reaction product, prepared by reaction in solution of terephthalic acid, or an amide or amide-forming derivative of that acid, with bis(4-aminocyclohexyl)methane or a mixture of isomers thereof, which mixture is liquid at room temperatures, is first dissolved in a solvent mixture comprising about ⅛ to ⅞ formic acid by weight and the remainder essentially a mononitrated or mono- or poly-halogenated organic compound in which at least one halogen-substituted carbon carries a hydrogen also. The resulting solution is converted into filaments by conventional means, such as dry spinning.

The polyamide according to this embodiment is formed from the difunctional reactants, i.e., diamine and terephthalic acid, its amide or amide-forming derivative thereof, by reaction at a temperature of less than about 50° C. and preferably at room temperature and atmospheric pressure. Although these polyamides are not adapted to be prepared by the usual melt methods because of their high melting points, they can be prepared by various powder polymerization methods or, where the polyamide is soluble in some non-degrading solvent, the polymerization reaction can be carried out at elevated temperature in this solvent. Generally, however, for purposes of convenience, it is desirable to prepare these polyamides by the so-called interfacial polymerization method wherein one ingredient, usually the diamine, is present in an aqueous phase and the other ingredient, usually the dibasic carboxylic acid chloride, is in an organic phase such that the two phases are substantially mutually insoluble. The fast reacting ingredients coming together at the interface between the two separate phases rapidly react, one with the other, to form a high molecular weight polyamide. The reaction is facilitated by violent agitation which, through dispersion of one phase throughout another produces a much larger interfacial area so that complete reaction of the limiting ingredient can be achieved in a relatively small time interval.

The diamines employed normally exist as a mixture of isomers, one or all of which may be solid at the same temperature; however, excessive concentration of the higher-melting isomers can render the mixture itself solid, and the present invention is directed only to solutions of polyamides derived from those diamines or diamines mixtures normally liquid at room temperature (about 25° C.).

The term "diamine" as used herein refers to any of the diamines above mentioned which are normally liquid at room temperature and to mixtures of these diamines and isomers thereof, which mixtures do not contain sufficient high melting isomers to render the mixture non-liquid. It is preferred that the amount of non-liquid isomer content of such a mixture be less than about 25% by weight. The isomeric nature of the diamines is discussed in U.S. 2,606,924 to Whitman.

As suggested above, either terephthalic acid itself or its amides or one of its many amide-forming derivatives may be selected for reaction with the selected diamine; among the more convenient amide-forming derivatives are the anhydride, halides, and carbamates of terephthalic acid, to mention a few.

The polyamide resulting from reaction in solution of the two components can be dissolved readily in the solvents of this invention, usually at room temperature, although higher temperature may be employed for convenience. Concentrations suitable for dry-spinning of filaments are obtainable without difficulty, usually containing an amount of polymer within the range of from about 1/10, which represents a practicable solubility minimum for present purposes, to about ¼ by weight based upon the solution.

For best filament formation, evaporation of the solvent should not require temperatures so high as to soften the polymer itself. The polyamides considered here do not melt until reaching temperatures of about 300° C. or above, so the normal boiling temperature of the solvent should be below 300° C. As the softening temperature of such polymer often is about 50 degrees below the melting temperature, occasionally even 60 or 70 degrees below, the boiling temperature of a solvent intended for dry-spinning preferably will not exceed that level.

Formic acid boils at about 100° C., and the second component of the solvent mixture may be either more or less volatile. However, inclusion of appreciable amounts of compounds containing more than 6 carbon atoms per molecule, especially when highly halogenated, is not desirable because conducive to high boiling temperature of the combined solvent. In general, lower aliphatic and alicyclic compounds are more compatible than aromatic compounds with formic acid, and an important feature of this invention is the spinning of the above polyamides from a solution in wholly aliphatic solvents.

In this invention a wide variety of solvent mixture combinations may be utilized. Solubilities of the linear polyamides of this invention in solvents containing formic acid and various compounds are indicated in Table I. For convenience, most of the solvent mixtures were made up equally of formic acid and the listed compound, and the percentage of the added component or components of the solvent appears only where a different ratio was selected for variety of exemplification. Similarly, the tabulated polymer concentrations are primarily illustrative, although solutions of lower polymer content generally are much less useful, as are extremely viscous solutions of very high concentrations.

TABLE I

| Additional Solvent Components: | Polymer Concentration, Percentage |
|---|---|
| Dichloromethane | 10 |
| Chlorobromomethane | 10 |
| 85% chloroform | 10 |
| 1,2-dichoroethane | 20 |
| Cis-dichloroethylene | 20 |
| 1,3-dichloropropane | 10 |
| Tetrafluoropropanol | 10 |
| Alpha,beta-dichloroethylether | 10 |
| Ethyldichloroacetate | 10 |
| 15.2% monochlorobenzene | 9 |
| 13.5% o-chlorotoluene | 9 |
| Chlorocyclohexane | 10 |
| 7% chlorocyclohexane, 5% chloroform | 10 |
| Nitrobenzene | 10 |
| Nitrocyclohexane | 10 |
| Nitromethane | 10 |
| Nitroethane | 10 |

When acetic acid was substituted for formic acid in the above solvent mixtures, the polymer did not dissolve. Similarly, substitution of other prospective solvent components (e.g., acetone, acetonitrile, N,N-dimethylformamide) for the nitrated or halogenated part of the mixture, while retaining the formic acid, did not result in solubility, despite recognized solvogenic properties in the substituted materials. As shown above, the solvent may have more than one component in addition to formic acid; also, though unnecessary, a single component may be both halogenated and nitrated.

When 1,2-bis(aminocyclohexyl)ethane, which is solid at room temperature, is reacted with terephthaloyl chloride to give a polymer with inherent viscosity of 1.03 (in sulfuric acid) and a melting temperature higher than 365° C., the solubility indicated above for the adjacent lower homolog is not achieved, no mixture of trichloroethane in formic acid proving capable of dissolving the polymer.

Also, for comparison, a mixture of isomeric bis(4-aminocyclohexyl)methanes solid at room temperature was reacted with terephthaloyl chloride in the manner described in Example I. This starting material contained predominantly the high melting (65° C.) trans-trans isomer of the diamine and had a boiling point of 170–172° C. at 0.2 mm. (Hg). The resulting polyamide had an inherent viscosity of 0.54 (in sulfuric acid) and a melting temperature above 375° C. and was insoluble in the single compounds and mixtures considered above.

Many of the solvent components mentioned above are compatible in alll proportions, but in some instances miscibility is limited to certain concentration ranges or temperature levels. Visual observation of a prospective solvent mixture in a test tube usually will give an adequate determination of compatibility; where the mixture though not homogeneous becomes clearer with warming to 60–70° C., it should prove satisfactory for spinning solutions at ordinary elevated temperatures. In general, presence of side chains increases compatibility of solvent components, especially if cyclic groups are present. Of course, reaction of the solvent components with one another is undesirable. Volatility of the solvent often is enhanced by chain branching and is impaired by multiple halogenation (particularly with the heavy halogens). Although halogenated or nitrated alcohols, acids, esters, ethers, and nitriles may be used in the solvent mixture with formic acid, the hydrocarbons are preferable because of their effectiveness, relative inertness, and the ease of recovering them in dry-spinning operations.

In accordance with this embodiment there is produced in filamentary form a linear polyamide having excellent tensile and work recovery and characterized by being predominantly amorphous rather than crystalline. In spite of this amorphous nature, the polyamide filaments of this invention have a tenacity and break elongation such that the product of the tenacity and break elongation is greater than about 50, high initial modulus, and high modulus retention at elevated temperatures in addition to possessing excellent flex and abrasion resistance.

The following examples illustrate the preparation of the polymers of this invention and the formation of these polymers into filaments. All parts and percentages are by weight unless otherwise indicated.

*Example I*

At room temperature an aqueous solution of 2 parts sodium "Lorol" sulfate and 10.6 parts sodium carbonate in 250 parts water is placed in a reaction vessel, and to this is added a solution of 10.5 parts of a liquid mixture of isomeric bis(4-aminocyclohexyl)methane and 189 parts chloroform. The mixture is agitated for 40 seconds, and then a solution of 10.2 parts terephthaloyl chloride and 189 parts chloroform is added, and the resulting reaction mixture is stirred for 10 minutes. Solid polymer separates and is filtered off, washed and dried. This polymer, which has a second-order transition temperature of about 220° C. and is found to have an inherent viscosity of 0.98 in m-cresol, is insoluble in formic acid and insoluble in 1,1,2-trichloroethane; however, it is soluble to concentration of at least 10% in mixtures of these two (at 25° C.) within the range of from 15% to 85% of each. Tenacious filaments are prepared readily from it by hand-spinning (as by withdrawing a stirring rod rapidly from the solution) and by dry-spinning methods using spinnerets in conventional manner. X-ray diffraction analysis shows that the filaments are predominantly amorphous.

*Example II*

A polymer prepared as in Example I is dissolved in a mixture of 50 parts trichloroethane and 50 parts anhydrous formic acid to give a solution with a solids content of 15% by weight. The polymer has an inherent viscosity of 0.88 in m-cresol, a melting point of 375° C., and a second-order transition temperature of 220° C.

After dry-spinning the polymer solution through a 5-hole spinneret, the resulting filament is wound up at a speed of 140 yards per minute and drawn in conventional manner to 2.5 times its original length over a pin heated to 170° C. The drawn filament is boiled off in a relaxed condition and examined. X-ray diffraction analysis indicates that the resulting filament was at least about 95% amorphous. The filament has a tenacity of 2.6 grams per denier, elongation of 33%, initial modulus of 32 grams per denier inherent viscosity of .085, and a zero strength temperature of 310° C. The filament dyes well with dispersed dyes, and the stability of the filament to alkali and acid is good. Thus, there is no loss in tenacity after treating the filament for 6 hours in one normal hydrochloric acid at 90° C., and the tenacity is also unaffected by 108 alkaline laundering cycles in which each cycle consisted of 40 minutes in a soap solution having a pH of 11 at 70° C. Inherent viscosity of the filament is 0.85 in m-cresol and the stick temperature (temperature at which the filament becomes tacky) is 235° C. Recovery of the filament from tensile elongation is 81% at 5% elongation, and the work recovery is 64% at 5% elongation.

*Example III*

A polyamide prepared as in Example I but with an inherent viscosity in m-cresol of 1.35 and having a melting point of 375° C. and a second-order transition temperature of 220° C. is dissolved in a mixture containing 40% trichloroethane and 60% anhydrous formic acid to produce a solution having 14% solids content. The solution is spun through a 5-hole spinneret and the resulting filaments drawn to 2.8 times their original length under a pin heated to 140° C. The filament is first boiled off while being held taut and then boiled off in a relaxed condition, resulting in a filament having a tenacity of 4.1 grams per denier and elongation of 21% and an initial modulus of 46 grams per denier. X-ray diffraction analysis showed that the filament is predominantly amorphous. Work recovery and recovery from tensile elongation of these filaments is excellent. Work recovery is measured on an electronic tensile tester using 10% permanent rate of extension followed by 30 seconds of static tension and recovery at the rate of 1% per minute. The filaments showed 63% work recovery at 5% elongation. Tensile recovery measurements made by loading filaments at the rate of 10% per minute showed an 88% recovery at 5% elongation.

These filaments were also tested to determine the retention of physical properties under various conditions. Table II shows a comparison of a filament of polyamide, formed from bis(4-aminocyclohexyl)methane and terephthaloyl chloride, and a filament of commercial polyhexamethylene adipamide with respect to Tg (second-order transition temperature) tenacity and initial modulus, the latter being measured under various moisture and temperature conditions.

*Table II*

|  | Commercial polyhexamethylene adipamide | Polyamide formed from bis(4-aminocyclohexyl) methane and Terephthaloyl Chloride |
| --- | --- | --- |
| Tg °C | 50 | 220 |
| Melting point °C | 250 | 375 |
| Tenacity (g.p.d.) | 4.32 | 4.1 |
| Initial Modulus (g.p.d.): |  |  |
| (1) As produced | 35 | 48 |
| (2) Boiled-off and Dried | 18 | 46 |
| (3) Wet @ 20° C | 10.8 | 29 |
| (4) Wet @ 90° C |  | 24 |
| (5) Dry @ 150° C | ¹ 9 | 18 |

¹ Different yarn sample, original tenacity=6.0.

Table II shows that filaments of this invention retain a higher level of physical properties under exposure to high temperatures, both when wet and dry, than filaments of commercial polyhexamethylene adipamide. The superior moisture resistance of the filaments of this invention is an unexpected and highly valuable quality which cannot be explained fully at the present time.

The filaments prepared in accordance with Example III are characterized by good dyeability, acid resistance, and alkali resistance of the same order of magnitude as those of Example I. The filaments have a zero strength temperature of about 310° C. and a stick temperature of 235° C. The inherent viscosity of the filament is about 1.20 (m-cresol), and the filament was characterized by an abrasion resistance of 5,686 cycles (Stoll Abrasion Tester) and a flex resistance of 50,600 cycles (Stoll Flex Tester). Abrasion resistance of the filament was about 20 times that of viscose rayon which is about the only synthetic filament having a zero strength temperature (327° C.) comparable to that of filaments of this invention.

*Example IV*

In accordance with the procedure of Example I a polymer is prepared from terephthaloyl chloride and a liquid diamine consisting of a mixture of isomers of bis(4-aminocyclohexyl)methane. The solid isomer content of the diamine mixture amounted to 25% by weight. The linear polyamide thus prepared has an inherent viscosity of 1.2 in m-cresol, a melting point of 360° C., a second-order transition temperature of 210° C., and an initial modulus of 42 grams per denier. After dissolving the polymer in sufficient mixture containing 40% trichloroethane and 60% anhydrous formic acid to produce a 12% solution, the resulting solution is spun through a 5-hole spinneret and the resulting filament wound up at a rate of 141 yards per minute. When drawn to 2.7 times its original length over a hot pin having a temperature of 168° C. and analyzed by X-ray diffraction techniques, the filament is found to be predominantly amorphous in character. The filament has a tenacity of 3.9 grams per denier, a break elongation of 21%, an inherent viscosity of 1.03, and a zero strength temperature of 305° C. The filament dyes well with dispersed dyes, and stability of the filament to alkali and acids is good. Stick temperature of the filament is 250° C. Recovery of the filament from tensile elongation is 86% at 5% elongation, and the work recovery is 90% at 5% elongation.

*Example V*

By procedure similar to that of Example I, a solution of 3,3'-dimethyldodecahydrobenzidine (mixture of isomers liquid at room temperature) is reacted with a solution of terephthaloyl chloride to obtain a polymer with inherent viscosity of 1.3 (in m-cresol) and a melting temperature greater than 365° C. A portion of this polymer is dissolved in a mixture of 40% trichloroethane and 60% formic acid to give a solution containing 17% polymer. This solution is spun through a three-hole spinneret at 117 yards per minute into an evaporative atmosphere into which the solvent volatilizes. The resulting yarn is drawn to 2 times its original length by passage over a hot pin and is found to have a tenacity of 1.7 grams per denier, with elongation of 34%. The tenacity remains unimpaired at all usual yarn-processing and textile-treating temperatures, and the yarn is self-supporting up to 320° C. Another portion of the polymer is cast into a tough film, which proves to have a water absorption of 7.5%.

*Example VI*

Hexahydro-2,4-diaminotoluene is reacted with terephthaloyl chloride by procedure similar to that of Example I to give a polymer with an inherent viscosity of 0.59 (in m-cresol) and a melting temperature of 350° C. In a subsequent run the same polymer is obtained with inherent viscosity of 0.78. This polymer is dissolved in a mixture of 53% chloroform and 47% anhydrous formic acid, and a clear tough film is cast from this solution. When cut into strips, the film can be drawn to 2.8 times its original length to give a tenacity of 0.75 gram per denier, with elongation of 10%. Filaments can be formed from the solution in analogous manner.

Similarly soluble were the fiber-forming polyamides obtained by like reaction of 1,4-diamino-2,3,5,6-tetramethylcyclohexane and 1,5-diaminodecalin individually with terephthaloyl chloride, both resulting polymers having inherent viscosity of 0.40 (in m-cresol) and melting temperatures of over 365° C.

Many of the solvent components mentioned above are compatible in all proportions, but in some instances miscibility is limited to certain concentration ranges or temperature levels. Visual observation of a prospective solvent mixture in a test tube usually will give an adequate determination of compatibility; where the mixture though not homogeneous becomes clearer with warming to 60–70° C., it should prove satisfactory for spinning solutions at ordinary elevated temperatures. In general, presence of side chains increases compatibility of solvent components, especially if cyclic groups are present. Of course, reaction of the solvent components with one another is undesirable. Volatility of the solvent often is enhanced by chain branching and is impaired by multiple halogenation (particularly with the heavy halogens). Although halogenated or nitrated alcohols, acids, esters, ethers, and nitriles may be used in the solvent mixture with formic acid, the hydrocarbons are preferable because of their effectiveness, relative inertness, and the ease of recovering them in dry-spinning operations.

This application is a continuation-in-part of applications Serial No. 604,614, now abandoned, and Serial No. 604,615, both filed by Charles R. Koller on August 17, 1956.

I claim:

1. A dry-spinning composition comprising a fiber-forming polyamide containing essentially recurring structural units of formula

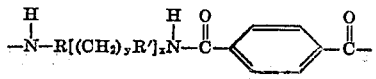

and prepared by reacting a terephethaloyl halide with a normally liquid diamine of formula

where R and R' represent alicyclic groups and $x$ and $y$ are integers with individual values of at least zero and at most unity; in solution in an organic solvent with a boiling temperature below the melting temperature of the polyamide, from about ⅛ to ⅞ of the solvent being composed of formic acid and the remainder being composed of at least one compound, containing at most about 6 carbon atoms, from the class consisting of mononitrated hydrocarbons and halogenated organic compounds, the latter having at least 1 hydrogen attached to at least 1 halogen-substituted carbon in the molecule.

2. Composition of claim 1 in which $x=0$.
3. Composition of claim 1 in which $x=1$ and $y=0$.
4. Composition of claim 1 in which $x=1$ and $y=1$.
5. Composition of claim 4 in which R and R' are cyclohexylene groups.
6. Composition of claim 1 in which the solvent comprises formic acid and a nitroalkane.
7. Composition of claim 1 in which the solvent comprises formic acid and a halogenated aliphatic hydrocarbon having at least 1 hydrogen attached to at least 1 halogen-substituted carbon in the molecule.
8. Composition of claim 7 in which the halogenated aliphatic hydrocarbon is 1,1,2-trichloroethane.
9. Composition of claim 8 in which the solution contains from about 1/10 to about ¼ of polyamide by weight and the solvent is composed of about equal amounts of formic acid and 1,1,2-trichloroethane.

References Cited in the file of this patent

UNITED STATES PATENTS

| | | |
|---|---|---|
| 2,516,585 | Pease | July 25, 1950 |
| 2,696,482 | Pease | Dec. 7, 1954 |
| 2,913,433 | Wittbecker | Nov. 17, 1959 |